United States Patent
Belman

(10) Patent No.: US 9,615,050 B2
(45) Date of Patent: Apr. 4, 2017

(54) TOPOLOGY PRESERVING INTENSITY BINNING ON REDUCED RESOLUTION GRID OF ADAPTIVE WEIGHTED CELLS

(71) Applicant: MOBILEYE VISION TECHNOLOGIES LTD., Jerusalem (IL)

(72) Inventor: Efim Belman, Jerusalem (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 386 days.

(21) Appl. No.: 14/181,861

(22) Filed: Feb. 17, 2014

(65) Prior Publication Data

US 2015/0235101 A1    Aug. 20, 2015

(51) Int. Cl.
G06K 9/46    (2006.01)
G06K 9/32    (2006.01)
G06K 9/00    (2006.01)
H04N 5/52    (2006.01)

(52) U.S. Cl.
CPC .......... H04N 5/52 (2013.01); G06K 9/00791 (2013.01); G06K 9/3233 (2013.01); G06K 9/4647 (2013.01)

(58) Field of Classification Search
CPC ............................... H04N 5/235; H04N 5/243
USPC ............................................ 348/221.1, 229.1
See application file for complete search history.

(56) References Cited

U.S. PATENT DOCUMENTS

| | | | |
|---|---|---|---|
| 5,712,682 A * | 1/1998 | Hannah | H04N 5/20 348/222.1 |
| 6,539,107 B1 | 3/2003 | Michael et al. | |
| 2009/0225189 A1* | 9/2009 | Morin | H04N 5/345 348/229.1 |
| 2011/0234854 A1* | 9/2011 | Kimura | G06K 9/00369 348/231.99 |
| 2013/0215244 A1 | 8/2013 | Mestha et al. | |
| 2014/0320679 A1* | 10/2014 | Lammers | G03B 17/38 348/208.2 |

FOREIGN PATENT DOCUMENTS

| | | |
|---|---|---|
| EP | 1416435 A2 | 5/2004 |
| EP | 1304651 B1 | 8/2013 |

OTHER PUBLICATIONS

"Dynamic Road Scene Classification: Combining motion with a visual vocabulary model", Anastasia Bolovinou, Information Fusion (Fusion), 2013 16th International Conference on. IEEE, 2013.

(Continued)

Primary Examiner — Nelson D. Hernández Hernández
(74) Attorney, Agent, or Firm — Reches Patents

(57) ABSTRACT

An image sensor and a pre-processing circuit adapted to associate weights respectively with cells of a grid. The cells respectively may include multiple contiguous picture elements of the image sensor. The pre-processing circuit may be configured to adaptively change the weights responsive to changes in the scene being imaged by the image sensor. The number of the cells per distance on the surface of the image sensor may be substantially less than the resolution of the image sensor. The cells which share the same weights may specify a region of interest on the image sensor.

28 Claims, 4 Drawing Sheets

(56) References Cited

OTHER PUBLICATIONS

Nummiaro, Katja,. "A color-based particle filter." First International Workshop on Generative-Model-Based Vision. vol. 2002. Denmark, Kopenhagen: Datalogistik Institut, Kobenhavns Universitet, 2002.
Crisman, Jill D., "Scarf: A color vision system that tracks roads and intersections." Robotics and Automation, IEEE Transactions on 9.1 (1993): 49-58.
He, Xuming, "Multiscale conditional random fields for image labeling." Computer Vision and Pattern Recognition, 2004. CVPR 2004. Proceedings of the 2004 IEEE Computer Society Conference on. vol. 2. IEEE, 2004.
"An image processing system for driver assistance" U. Handmann, Image and Vision Computing 18 (2000) 367-376.
Boreczky, John S., "A hidden Markov model framework for video segmentation using audio and image features." Acoustics, Speech and Signal Processing, 1998. Proceedings of the 1998 IEEE International Conference on. vol. 6. IEEE, 1998.
Ma, Li,. "Iris recognition using circular symmetric filters." Pattern Recognition, 2002. Proceedings. 16th International Conference on. vol. 2. IEEE, 2002.
Stauffer, Chris,. "Learning patterns of activity using real-time tracking." Pattern Analysis and Machine Intelligence, IEEE Transactions on 22.8 (2000): 747-757.
Matusik, Wojciech, et al. "Image-based visual hulls." Proceedings of the 27th annual conference on Computer graphics and interactive techniques. ACM Press/Addison-Wesley Publishing Co., 2000.
Stauffer, Chris,. "Adaptive background mixture models for real-time tracking." Computer Vision and Pattern Recognition, 1999. IEEE Computer Society Conference on.. vol. 2. IEEE, 1999.
Pass, Greg,. "Histogram refinement for content-based image retrieval." Applications of Computer Vision, 1996. WACV'96., Proceedings 3rd IEEE Workshop on. IEEE, 1996.
Flickner, Myron, et al. "Query by image and video content: The QBIC system." Computer 28.9 (1995): 23-32.
Jin, Hailin,. "Real-time feature tracking and outlier rejection with changes in illumination." Computer Vision, 2001. ICCV 2001. Proceedings. Eighth IEEE International Conference on. vol. 1. IEEE, 2001.
Subbarao, M. (Dec. 1988). Parallel Depth Recovery by Changing Camera Parameters. In ICCV (pp. 149-155).
Baek, Nakhoon. "Vehicle area segmentation using grid-based feature values." Computer Analysis of Images and Patterns. Springer Berlin Heidelberg, 2005.

* cited by examiner

TOPOLOGY PRESERVING INTENSITY BINNING ON REDUCED RESOLUTION GRID OF ADAPTIVE WEIGHTED CELLS

BACKGROUND

1. Technical Field

The present invention relates to pre-processing in a camera.

2. Description of Related Art

Image histogram calculations are present on many modern digital cameras. Photographers may use the image histogram as an aid to show the distribution of tones captured, and whether image detail has been lost. In a histogram, the horizontal axis of the graph may represent tonal variations, red/green/blue and/or gray scale. The vertical axis may represent the number of pixels in each tone.

During the last few years camera based driver assistance systems (DAS) have been entering the market; including lane departure warning (LDW), automatic high-beam control (AHC), traffic sign recognition (TSR) forward collision warning (FCW) and pedestrian detection.

BRIEF SUMMARY

Various camera systems are provided for herein including an image sensor and a pre-processing circuit adapted to associate weights respectively with cells of a grid. The cells respectively may include multiple contiguous picture elements of the image sensor. The pre-processing circuit may be configured to adaptively change the weights responsive to changes in the scene being imaged by the image sensor. The number of the cells per distance on the surface of the image sensor may be substantially less than the resolution of the image sensor. The cells which share the same weights may specify a region of interest on the image sensor. The weights associated with the cells of the region of interest may be non-zero and the weights associated with cells of the grid outside the region of interest may be zero. The camera is mountable on a vehicle, and the region of interest may include an image of a road in the environment of the vehicle.

An image processor may be connected to the image sensor. The pre-processing circuit may calculate a pre-processing result over the region of interest. The image processor may be configured to receive the pre-processing result from the pre-processing circuit. The image processor responsive to the pre-processing result may reset a camera parameter such as gain, exposure time and/or aperture.

The pre-processing circuit may perform a weighted histogram by summing instances of a key over the cells of the grid. The key may include the weights as a multiplicative factor. The key may be a function of an image parameter such as image intensity, color intensity of at least one color, gradient of image intensity and/or gradient of color intensity.

The image processor may estimate ego-motion of the image sensor. The image processor, responsive to the estimated ego-motion of the camera, may reset one or more weights of one or more of the cells. The image processor may estimate image motion of an object in the field of view of the image sensor and responsive to the estimated image motion reset one or more of the weights of one or more of the cells.

Various computerized methods are provided herein for pre-processing image data of an image frame in an image sensor. Weights are associated respectively with cells of a grid. The cells respectively may include multiple contiguous picture elements of the image sensor. The weights may be adaptively changed responsive to changes in the scene being imaged by the image sensor. Multiple picture elements of the image sensor may be grouped contiguously into the cells of the grid with a number of cells per distance on the surface of the image sensor substantially less than the resolution of the image sensor. The image sensor may be mounted on a vehicle as a part of a driver assistance system. A region of interest may be determined to include cells of non-zero weight which image at least a portion of a road in the environment of the vehicle when traveling. Responsive to the weights, a pre-preprocessing result may be calculated. A camera parameter may be reset responsive to the pre-processing result. A weighted histogram may be performed by summing instances of a key over the cells of the grid. The key may include the weights as a multiplicative factor. The key may be a function of at least one image parameter: image intensity, color intensity of at least one color, gradient of image intensity and/or gradient of color intensity. Ego-motion of the image sensor may be estimated and responsive to the estimated ego-motion one or more of the weights of one or more of the cells may be reset. Image motion of an object being tracked in the field of view of the image sensor may be estimated and responsive to the estimated image motion, one or more of the weights of one or more of the cells may be reset.

The foregoing and/or other aspects will become apparent from the following detailed description when considered in conjunction with the accompanying drawing figures.

BRIEF DESCRIPTION OF THE DRAWINGS

The invention is herein described, by way of example only, with reference to the accompanying drawings, wherein.

DETAILED DESCRIPTION

Figure 1:
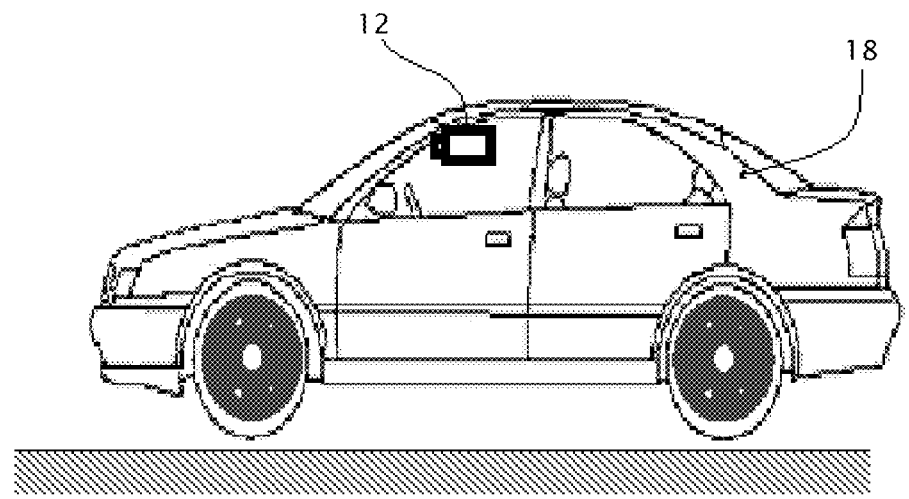
FIGS. 1 and 2 illustrate a system including a camera or image sensor mountable in a vehicle, according to an aspect of the present invention.

Reference will now be made in detail to features of the present invention, examples of which are illustrated in the accompanying drawings, wherein like reference numerals refer to the like elements throughout. The features are described below to explain the present invention by referring to the figures.

Before explaining features of the invention in detail, it is to be understood that the invention is not limited in its application to the details of design and the arrangement of the components set forth in the following description or illustrated in the drawings. The invention is capable of other features or of being practiced or carried out in various ways. Also, it is to be understood that the phraseology and terminology employed herein is for the purpose of description and should not be regarded as limiting.

By way of introduction, various embodiments of the present invention are directed to defining a region of interest in one or more image frames. In general, the region of interest may be selected by including an image portion having the high variation in dynamic range over time from image frame to image frame. Portions of the image having little variation in dynamic range such as sky or landscape may be excluded from the region of interest. The region of interest in image frames of camera based driver assistance systems may include the image of the road shown below the horizon, where images of other vehicles, traffic signs pedestrians and road obstructions are found. The position, shape and size of the region of interest may be specific for one or more monitor and/or control algorithms. The image may be pre-processed in the region of interest such as by computing a histogram which may be used by the monitor/control algorithm. A feature of the present invention includes a simple and efficient adjustment of the position of the region of interest over the image plane by keeping the topology of the region of interest similar to a canonical topology selected as appropriate for the monitor/control algorithm. The region of interest may be specified using multiplicative weighting factors or weights over a spatially constant grid of reduced resolution in the image area. The weights provide flexibility of preserving the predefined topology of region of interest as well as a simple ability to adjust the position of the region of interest by varying the values of the weights typically over a relatively small number of cells at the periphery of the grid. The fine details of the periphery of the region may be smoothed to the level of the reduced resolution by scaling the weights of the peripheral cells to be proportional to the area of the cells within the region of interest.

Embodiments of the present invention may be useful to provide flexible and efficient method of controlling the location of the region of interest over the image surface as a result of ego-motion of the camera or image motion of an object of interest being tracked. In driver assistance systems, improved obstruction detection in the road environment may be achieved when the obstruction and road have minimal image contrast and/or in images which include the sun above the horizon outside the region of interest.

Thus there is a need for and it would be advantageous to have a camera in which the region of interest of the image may be specified by weights over a low resolution grid of cells in the image frames.

Figure 2:
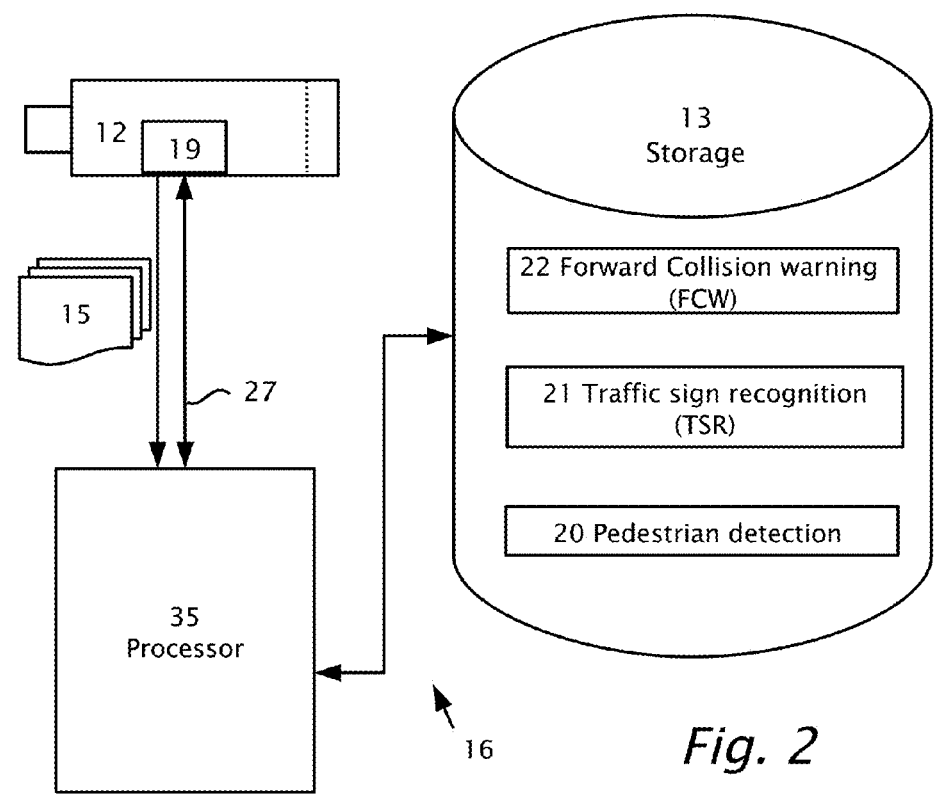

Referring now to the drawings, reference is now made to FIGS. 1 and 2 which illustrate a system 16 including a camera or image sensor 12 mountable in a vehicle 18, according to an aspect of the present invention. Image sensor 12, images a field of view in the forward direction. Image sensor 12 may be monochrome or black-white, i.e. without color separation or image sensor 12 may be color sensitive. Image frames 15 from camera 12 are captured and processed by image processor 35. Camera 12 includes a pre-processing circuit 19 which preprocesses image frames 15 and may provide a monitor signal or may receive a control signal over a monitor/control bus 27 to or from image processor 35 as a result of the pre-preprocessing. The monitor signal may include histogram information being provided to image processor 35.

Image processor 35 may be used to process image frames 15 simultaneously and/or in parallel to serve a number of driver assistance systems/applications. Image processor 35 may be used to process image frames 15 to detect and recognize an image or portions of the image in the forward field of view of camera 12. The driver assistance systems may be implemented using specific hardware circuitry (not shown) with on board software and/or software monitor/control algorithms in storage 13. By way of example in FIG. 2, image frames 15 are used to serve pedestrian detection 20, traffic sign recognition (TSR) 21 and forward collision warning (FCW) 22 according to features of the present invention.

In some cases, image frames 15 are partitioned between different driver assistance applications and in other cases the image frames 15 may be shared between the different driver assistance applications.

Figure 3:
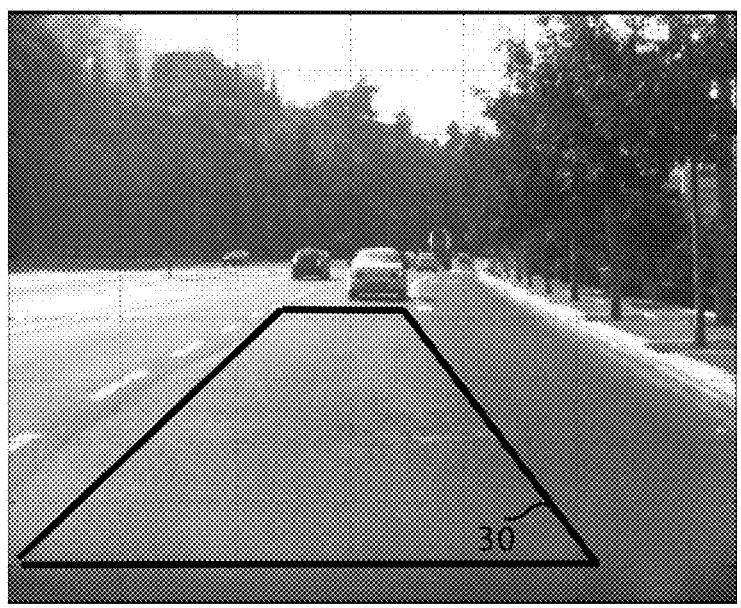
FIG. 3 shows an image frame from a road scene according to a feature of the present invention.

Reference is now made to FIG. 3 which shows an image frame 15 from a road scene according to a feature of the present invention. Image frame 15 in FIG. 3 shows a road scene as captured by image sensor 12. A region of interest 30 is shown as a trapezoid and indicates an image of road in front of vehicle 18 as a region of image frame 15 which is of particular importance for driver assistance functions such as pedestrian detection 20, traffic sign recognition (TSR) 21, forward collision warning (FCW) 22, detection of lane markers or obstructions in the road surface like manhole covers. For other driver assistance applications or for image processing in a field other than driver assistance, a region of interest 30 of different size, shape, position and/or orientation in image space may be selected a priori.

Figure 4A:
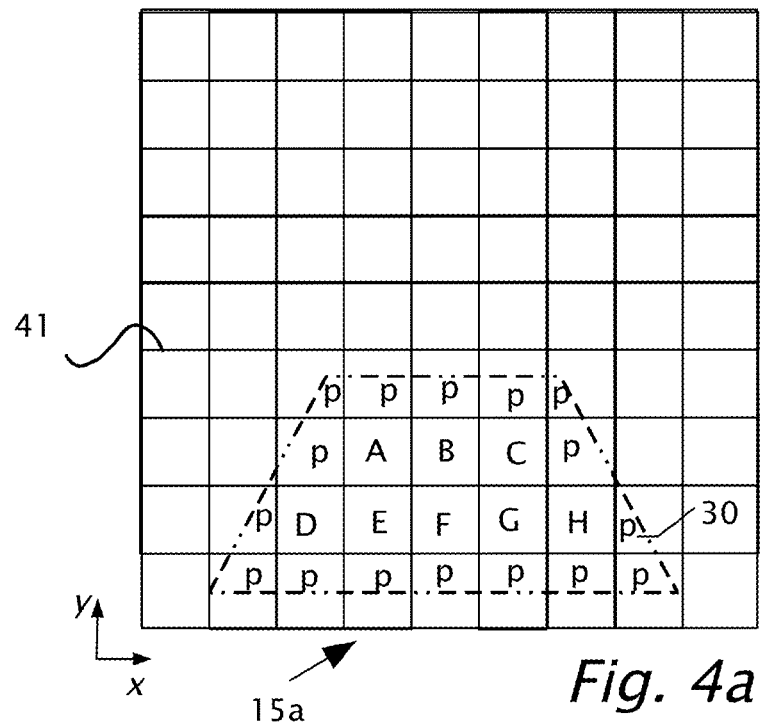
FIG. 4a illustrates region of interest superimposed onto an image frame respectively, according to a feature of the present invention.

Reference is now made to FIG. 4a which illustrates region of interest 30 superimposed onto image frame 15a respectively, according to a feature of the present invention. Picture elements in an image frame 15a captured by image sensor 12 are shown as parametrized by a coarse grid 41, e.g. 50 by 50 pixels. Coarse grid 41 may be used to specify region of interest 30. In order to specify region of interest 30, 8 cells labeled individually with letters A-H are entirely within region of interest 30. The perimeter of region of interest, e.g. trapezoid 30 crosses 16 cells, labeled with letter 'p'.

Figure 5:
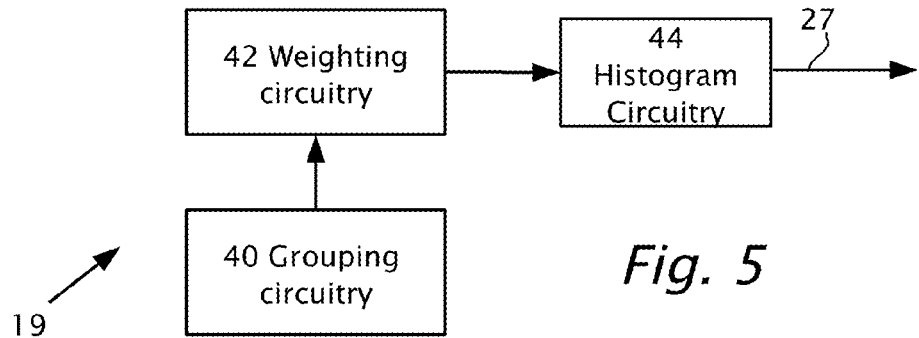
FIG. 5, shows a simplified block diagram of pre-processing circuitry according to aspects of the present invention.
Figure 6:
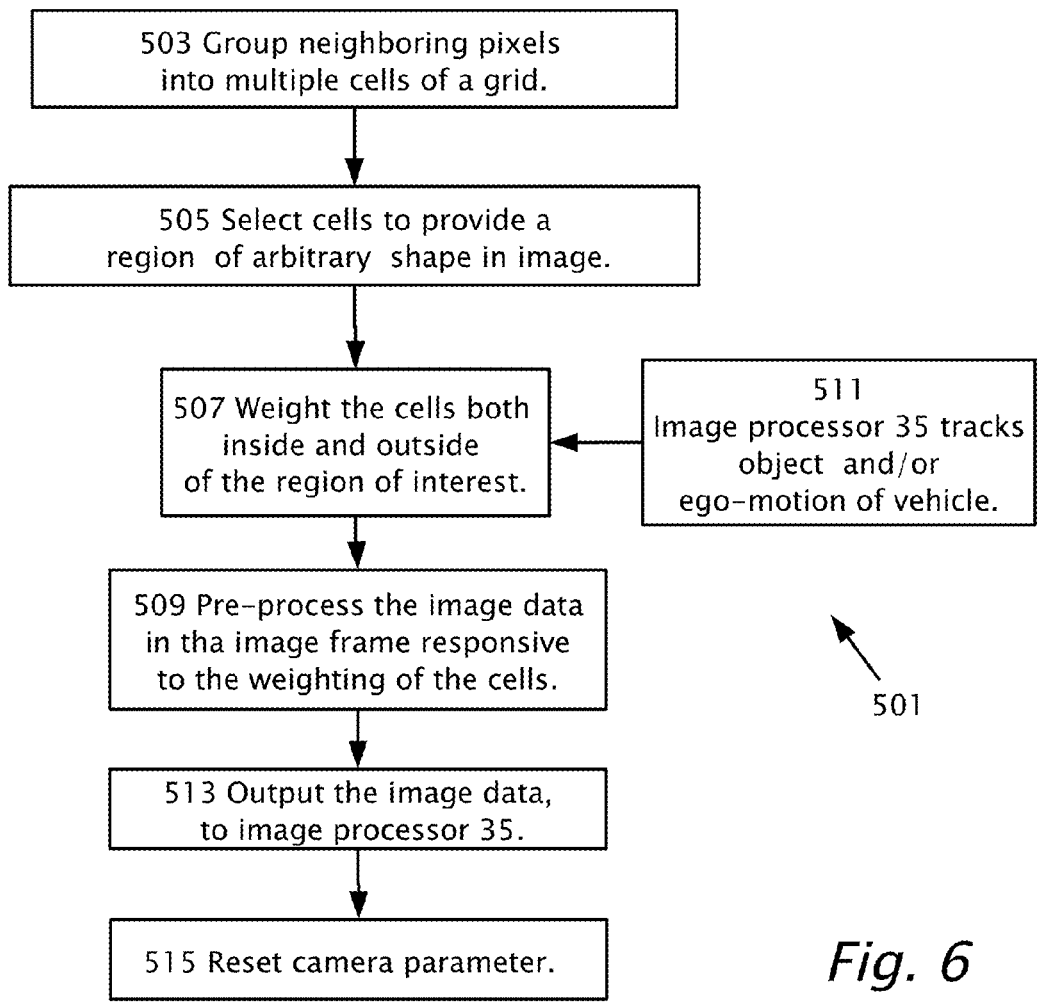
FIG. 6 shows a flow diagram of a process according to aspects of the present invention.

Reference is now made also to FIG. 5, which is a simplified block diagram of preprocessing circuitry 19 and to FIG. 6 which is a flow diagram 501 of a process according to aspects of the present invention. In FIG. 5, grouping circuitry 40 functions to group pixels (step 503) into cells of a low resolution grid, for instance grid 41 shown in FIG. 4a. By selecting cells of grid 41, a region of arbitrary shape may be provided (step 505). The region of arbitrary shape may be contiguous as in region of interest 30 as shown in FIGS. 3 and 4a, or non-contiguous. Weighting circuitry 42, provides (step 507) a weight e.g. one, to all the pixels of the selected cells, for instance cells A-H in region of interest 30 of FIG. 4a. For cells p which lie on the perimeter of region of interest 30, weighting circuitry 42 may assign a weight between zero and one which is proportional to the number of pixels within region of interest 30, or proportional to the cell area within region of interest 30 divided by the total cell area. Outside the region of interest, the cells of grid 41 are normally weighted with smaller weights such as zeros. Histogram circuitry 44 may pre-process (step 509) image frames 15 responsive to the weights of the cells. Examples of pre-processing may include calculating histogram information, average and/or median of grey scale intensities or average color in Red/Green/Blue intensity values. The image information may be output (step 513) to image processor 35 over monitor signal line 27. A camera control parameter, e.g. gain, exposure time, for controlling camera 12 may be reset (step 515) via control line 27 responsive to the information received in step 513.

In step 511, ego-motion of vehicle 18 may be detected and/or an image of an object of interest may be tracked by image processor 35. Based on the detected ego-motion and/or tracked image of an object of interest, region of interest 30 may be adjusted by signaling of control line 27. On receiving the signal, pre-processing circuit re-adjusts weights (step 507) of the cells of grid 41 in order to maintain the tracked image within region of interest 30 independent of the ego-motion of camera 12. For instance, the horizon image may be detected (step 511) which varies in image height dependent on the pitch angle of vehicle 18. Region of interest 30 may be maintained within 50 pixels for instance at the same vertical image distance relative to the imaged horizon independent of the changing pitch angle of vehicle 18, by adjusting weights (step 507) according cells of grid 41.

Figure 4B:
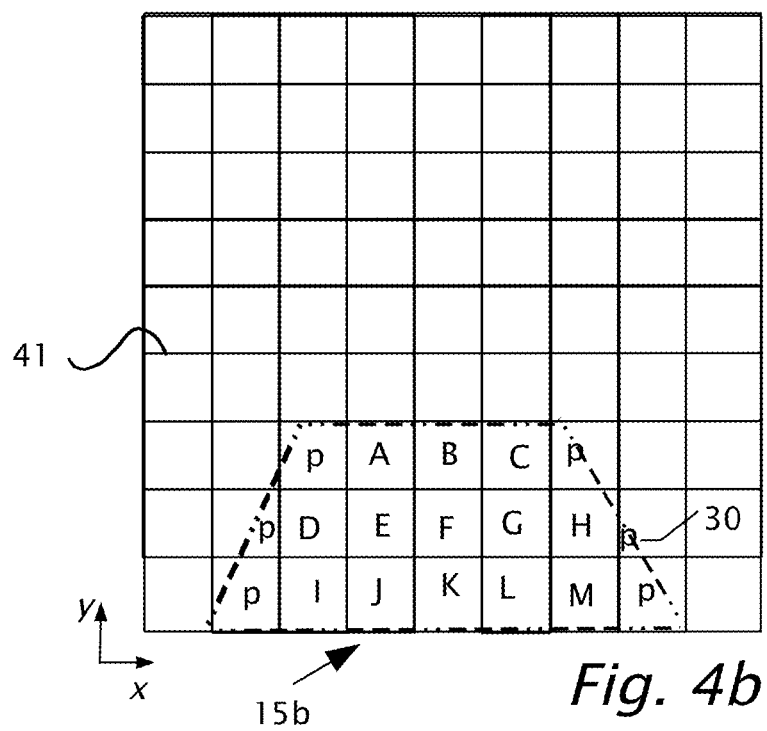
FIG. 4b illustrates the region of interest re-projected onto the grid of the image frame due to ego-motion of the camera or image motion of an object being tracked, according to a feature of the present invention.

Reference is now also made to FIG. 4b which illustrates an example of region of interest 30 re-projected onto grid 41 of image frame 15b responsive to detected ego-motion of camera 12 and/or image motion of an object being tracked, according to a feature of the present invention. Image frame 15b of FIG. 4b illustrates for instance a case that the pitch angle of vehicle 18 is positive (upward) relative to the pitch angle of vehicle 18 when image frame 15a of FIG. 4a is captured. In order to maintain tracking and/or region of interest 30 on the road at the same distance always from vehicle 18, weights of cells of grid 41 are re-adjusted (step 507). In the specific example of image frame 15b of FIG. 4b, weights of cells labelled A, B, C, D, E, F, G, H remain the same as the weights assigned to cells A-H in image frame 15a of FIG. 4a. Region of interest 30 is updated and relocated by adjusting peripheral cells labelled I, J, K, L and additional cells p partially within region of interest 30. The use of low resolution grid 41 thus allows for a calculationally efficient mechanism for maintaining region of interest 30 in the desired portion of images frames 15 since normally only a small number of peripheral cells need to have respective weights updated in step 507.

Although embodiments of the present invention are presented in the context of driver assistance applications, embodiments of the present invention may be equally applicable in other real time signal processing applications and/or digital processing applications, such as communications, machine vision, audio and/or speech processing as examples.

The term "resolution" as used herein refers to a number of picture elements per distance for instance along a horizontal and/or vertical line on the surface of the image sensor.

The term "weight" as used herein refers to a multiplicative scale factor for performing image processing over images. A weight of zero generally means that the pixel or group of pixels is not included in the processing. The higher the non-zero weight the more the pixel or group of pixels is considered in the processing.

The term "contiguous" as used herein is defined herein by selecting two points of a geometric region and if the line segment connecting the two points wholly lies in the geometric region, then the geometric region is contiguous.

The term "region of interest" as used herein refers to a region in image space the shape and dimensions of which remain essentially unchanged over multiple image frames. The term "region of interest" as used herein is NOT an image of an object being tracked.

The term "ego-motion" as used herein refers to at least the angular re-orientation of the image sensor over angles" pitch, yaw and roll.

The term "key" as used herein refers to a parameter of interest selected for pre-processing an image. The "key" is used to represent a horizontal axis and instances of particular values of the key are summed to generate a histogram.

The indefinite articles "a", "an" is used herein, such as "an image" has the meaning of "one or more" that is "one or more images".

Although selected features of the present invention have been shown and described, it is to be understood the present invention is not limited to the described features. Instead, it is to be appreciated that changes may be made to these features without departing from the principles and spirit of the invention, the scope of which is defined by the claims and the equivalents thereof.

What is claimed is:

1. A camera system including:
an image sensor that is controlled by one or more camera parameters; and
a pre-processing circuit adapted to associate weights respectively with cells of a grid, wherein the weights differ from the one or more camera parameters, wherein the cells respectively include a plurality of contiguous picture elements of the image sensor; wherein the pre-processing circuit is configured to adaptively change the weights responsive to changes in the scene being imaged by the image sensor; and
wherein the pre-processing circuit is adapted to perform a weighted histogram by summing instances of a key over the cells of the grid, wherein the key includes the weights as a multiplicative factor.

2. The camera system of claim 1, wherein the number of the cells per distance on the surface of the image sensor is substantially less than the resolution of the image sensor.

3. The camera system of claim 1, wherein cells which share the same non-zero weights specify a region of interest on the image sensor.

4. The camera system of claim 3, wherein the weights associated with cells of the grid outside the region of interest are zero.

5. The camera system of claim 3, wherein the image sensor is mountable on a vehicle, and wherein said region of interest includes an image of a road in the environment of the vehicle.

6. The camera system of claim 1, wherein the pre-processing circuit calculates a pre-processing result over the region of interest, the camera system further comprising: an image processor operatively connectable to the image sensor, wherein the image processor is configured to receive the pre-processing result from the pre-processing circuit, wherein the image processor responsive to the pre-processing result resets a camera parameter of the one or more camera parameters.

7. The camera system of claim 6, wherein said camera parameter is selected from the group consisting of: gain, exposure time and aperture.

8. A camera system including:
an image sensor that is controlled by one or more camera parameters;
a pre-processing circuit adapted to associate weights respectively with cells of a grid, wherein the weights differ from the one or more camera parameters, wherein the cells respectively include a plurality of contiguous picture elements of the image sensor; wherein the pre-processing circuit is configured to adaptively change the weights responsive to changes in the scene being imaged by the image sensor; wherein the pre-processing circuit calculates a pre-processing result over the region of interest; and an image processor operatively connectable to the image sensor;

wherein the image processor is configured to receive the pre-processing result from the pre-processing circuit, wherein the image processor responsive to the pre-processing result resets a camera parameter of the one or more camera parameters; and wherein said camera parameter is an aperture.

9. The camera system of claim 1, wherein the key is a function of at least one image parameter selected from the group consisting of: image intensity, color intensity of at least one color, gradient of image intensity and gradient of color intensity.

10. The camera system of claim 1, further comprising: an image processor operatively connectable to the image sensor, wherein said image processor estimates ego-motion of the image sensor, wherein the image processor responsive to the estimated ego-motion of the image sensor resets at least one the weights of at least one of the cells.

11. The camera system of claim 1, further comprising: an image processor operatively connectable to the image sensor, wherein said image processor estimates image motion of an object in the field of view of the image sensor and responsive to the estimated image motion resets at least one of the weights of at least one of the cells.

12. The camera system of claim 1, wherein the key is a function of at least one image parameter selected from the group consisting of: gradient of image intensity and gradient of color intensity.

13. A computerized method for pre-processing image data of an image frame in an image sensor, the computerized method comprising:

associating weights respectively with cells of a grid, wherein the cells respectively include a plurality of contiguous picture elements of the image sensor; wherein the image sensor is controlled by one or more camera parameters; wherein the weights differ from the one or more camera parameters, adaptively changing the weights responsive to changes in the scene being imaged by the image sensor; and performing a weighted histogram by summing instances of a key over the cells of the grid, wherein the key includes the weights as a multiplicative factor.

14. The computerized method of claim 13, further comprising: grouping contiguously picture elements of the image sensor into the cells of the grid with a number of cells per distance on the surface of the image sensor substantially less than the resolution of the image sensor.

15. The computerized method of claim 13, further comprising: mounting the image sensor on a vehicle as a part of a driver assistance system, wherein a region of interest is determined to include cells of non-zero weight which image at least a portion of a road in the environment of the vehicle when traveling.

16. The computerized method of claim 13, further comprising: responsive to the weights, calculating a pre-processing result.

17. The computerized method of claim 16, further comprising: resetting a camera parameter of the one or more camera parameters responsive to the pre-processing result.

18. The computerized method of claim 13, wherein the key is a function of at least one image parameter selected from the group consisting of: image intensity, color intensity of at least one color, gradient of image intensity and gradient of color intensity.

19. The computerized method of claim 13, further comprising: estimating ego-motion of the image sensor; responsive to the estimated ego-motion, resetting at least one of the weights of at least one of the cells.

20. The computerized method of claim 13, further comprising: estimating image motion of an object being tracked in the field of view of the image sensor; responsive to the estimated image motion, resetting at least one of the weights of at least one of the cells.

21. The computerized method of claim 13, wherein the key is a function of at least one image parameter selected from the group consisting of: gradient of image intensity and gradient of color intensity.

22. The camera system of claim 8, wherein the pre-processing circuit is adapted to perform a weighted histogram by summing instances of a key over the cells of the grid, wherein the key includes the weights as a multiplicative factor.

23. The camera system of claim 8, wherein said image processor estimates ego-motion of the image sensor, wherein the image processor responsive to the estimated ego-motion of the image sensor resets at least one of the weights of at least one of the cells.

24. The camera system of claim 8, wherein said image processor estimates image motion of an object in the field of view of the image sensor and responsive to the estimated image motion resets at least one of the weights of at least one of the cells.

25. A computerized method for pre-processing image data of an image frame in an image sensor, the computerized method comprising:

associating weights respectively with cells of a grid, wherein the cells respectively include a plurality of contiguous picture elements of the image sensor; wherein the image sensor is controlled by one or more camera parameters; wherein the weights differ from the one or more camera parameters;

adaptively changing the weights responsive to changes in the scene being imaged by the image sensor; and resetting a camera parameter of the one or more camera parameters responsive to the pre-processing result;

wherein said camera parameter is an aperture.

26. The computerized method of claim 25, further comprising: performing a weighted histogram by summing instances of a key over the cells of the grid, wherein the key includes the weights as a multiplicative factor.

27. The computerized method of claim 25, further comprising: estimating ego-motion of the image sensor; responsive to the estimated ego-motion, resetting at least one of the weights of at least one of the cells.

28. The computerized method of claim 25, further comprising: estimating image motion of an object being tracked in the field of view of the image sensor; responsive to the estimated image motion, resetting at least one of the weights of at least one of the cells.

* * * * *